United States Patent
Hunt et al.

(10) Patent No.: US 12,003,846 B2
(45) Date of Patent: Jun. 4, 2024

(54) METHOD, COMPUTER PROGRAM, AND DEVICES FOR IMAGE ACQUISITION

(71) Applicant: Telefonaktiebolaget LM Ericsson (publ), Stockholm (SE)

(72) Inventors: Alexander Hunt, Tygelsö (SE); Andreas Kristensson, Södra Sandby (SE)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 310 days.

(21) Appl. No.: 17/425,936

(22) PCT Filed: Feb. 12, 2019

(86) PCT No.: PCT/EP2019/053458
§ 371 (c)(1),
(2) Date: Jul. 26, 2021

(87) PCT Pub. No.: WO2020/164693
PCT Pub. Date: Aug. 20, 2020

(65) Prior Publication Data
US 2022/0303456 A1     Sep. 22, 2022

(51) Int. Cl.
*H04N 23/611* (2023.01)
*G06F 3/01* (2006.01)
*H04N 23/951* (2023.01)

(52) U.S. Cl.
CPC ........... *H04N 23/611* (2023.01); *G06F 3/013* (2013.01); *H04N 23/951* (2023.01)

(58) Field of Classification Search
CPC ..... H04N 23/611; H04N 23/951; G06F 3/013
See application file for complete search history.

(56) References Cited

U.S. PATENT DOCUMENTS 10,466,484 B1 * 11/2019 Yoon .................... H04N 13/332
10,497,295 B1 * 12/2019 Jia ......................... G02B 27/017
(Continued)

FOREIGN PATENT DOCUMENTS

| EP | 1301021 A2 | 4/2003 |
| EP | 2608524 A1 | 6/2013 |

(Continued)

OTHER PUBLICATIONS

PCT International Search Report, dated Oct. 21, 2019, in connection with International Application No. PCT/EP2019/053458, all pages.

(Continued)

*Primary Examiner* — Jason A Flohre
(74) *Attorney, Agent, or Firm* — Leffler Intellectual Property Law, PLLC

(57) ABSTRACT

There is provided an image acquisition controller for acquiring an adapted image. The image acquisition controller comprises an interface towards a first image sensor, the first image sensor being arranged to acquire an image, and an interface towards a gaze tracking unit, the gaze tracking unit comprising a second image sensor for registering a gaze position on a scene associated with the image acquired by the first image sensor. The image acquisition controller is arranged to periodically receive information over the interface towards the gaze tracking unit about at least a position on the scene associated with the image provided from the first image sensor where the scene represents a larger part of an image registered by the first image sensor than intended to be acquired as the adapted image. The image acquisition controller is arranged to provide information over the interface towards the first image sensor about a position on the first image sensor, a size of a sensor area associated with the position on the first image sensor and a frame rate for image acquisition within said area. The image acquisition control- (Continued)

ler is arranged to receive image data over the interface towards the first image sensor wherein the image data at least comprises image data with the size, the position on the first image sensor, and the frame rate for image acquisition within said area such that the received image data is stored. An image acquisition system or device comprising the controller, a communication device with corresponding image acquisition capabilities, a method of image acquisition, and a computer program for implementing the method are also disclosed.

12 Claims, 5 Drawing Sheets

(56) References Cited

U.S. PATENT DOCUMENTS

| 2008/0080846 | A1 | 4/2008 | Grip |
| 2012/0146891 | A1 | 6/2012 | Kalinli |
| 2015/0002676 | A1* | 1/2015 | Yoo .................. H04N 7/181 348/159 |
| 2015/0220768 | A1 | 8/2015 | Ronnecke et al. |
| 2016/0132189 | A1* | 5/2016 | Choi .................. G06F 3/012 345/633 |
| 2018/0067551 | A1 | 3/2018 | Skogo et al. |
| 2018/0227470 | A1 | 8/2018 | Ronngren |
| 2019/0050664 | A1* | 2/2019 | Yang .................. G06F 3/011 |
| 2019/0347501 | A1* | 11/2019 | Kim .................. G06V 10/764 |
| 2019/0387168 | A1* | 12/2019 | Smith .................. G06F 3/013 |

FOREIGN PATENT DOCUMENTS

| EP | 3258344 A1 | 12/2017 |
| WO | 2015066475 A1 | 5/2015 |
| WO | 2018057450 A1 | 3/2018 |

OTHER PUBLICATIONS

PCT Written Opinion, dated Oct. 21, 2019, in connection with International Application No. PCT/EP2019/053458, all pages.

* cited by examiner

METHOD, COMPUTER PROGRAM, AND DEVICES FOR IMAGE ACQUISITION

TECHNICAL FIELD

The present invention generally relates to an image acquisition controller, an image acquisition system or device comprising the controller, a communication device with corresponding image acquisition capabilities, a method of image acquisition, and a computer program for implementing the method. In particular, the invention relates to acquiring images in a power lean way.

BACKGROUND

In some digital camera applications, objects present in an image are to be identified. Based on the identified objects, different functions may be controlled, such as tracking the objects for focusing, recognising the objects for image classification, suggested cropping of the image, etc. One approach for identifying these objects are to use image processing algorithms such as Speeded-Up Robust Features (SURF), Scale Invariant Feature Transform (SIFT), Oriented FAST and Rotated BRIEF (ORB), where FAST is corner detection method Features from Accelerated Segment Test and BRIEF is visual descriptor Binary Robust Independent Elementary Features, etc. One issue with such image processing algorithms is that they are consuming considerable computing and power resources, especially when applied to large image data. This may be alleviated by performing the processing at a host which is less constrained in those senses than for example a portable device capturing the image. However, there is still a drawback when the transmission of the large image data is to be provided to the host, e.g. over a wireless interface.

It is therefore a desire to limit the amount of data to be processed and/or to be transmitted for processing at a host. However, this creates a Catch-22 problem since the selection of objects to limit the amount of data to be processed is what the limitation is for. It is thus a problem how to tie up this Catch-22 problem.

The above information disclosed in this Background section is only for enhancement of understanding of the background of the invention and therefore it may contain information that does not form the prior art that is already known to a person of ordinary skill in the art.

SUMMARY

The invention is based on the understanding that at image capturing by a person, where the person uses a view, such as for augmented reality applications, or preview such as a screen or a viewfinder, the person's eye will inherently look at the points of interest in the scene where the objects are likely to be found. The inventors have realized that by making a pre-selection based on the person's gaze, using eye tracking, the parts of the originally captured image by an image sensor can be selected and stored. The stored adapted, i.e. limited, image can then be processed or transmitted for processing at a host.

According to a first aspect, there is provided an image acquisition controller for acquiring an adapted image. The image acquisition controller comprises an interface towards a first image sensor, the first image sensor being arranged to acquire an image, and an interface towards a gaze tracking unit, the gaze tracking unit comprising a second image sensor for registering a gaze position on a scene associated with the image acquired by the first image sensor. The image acquisition controller is arranged to periodically receive information over the interface towards the gaze tracking unit about at least a position on the scene associated with the image provided from the first image sensor where the scene represents a larger part of an image registered by the first image sensor than intended to be acquired as the adapted image. The image acquisition controller is arranged to provide information over the interface towards the first image sensor about a position on the first image sensor, a size of a sensor area associated with the position on the first image sensor and a frame rate for image acquisition within said area. The image acquisition controller is arranged to receive image data over the interface towards the first image sensor wherein the image data at least comprises image data with the size, the position on the first image sensor, and the frame rate for image acquisition within said area such that the received image data is stored.

The image acquisition may be arranged to monitor timing of the information over the interface towards the gaze tracking unit about a gaze at the respective position on the scene, wherein the size of the sensor area associated with the position depends on a duration of the gaze at the position, respectively.

The interface towards the first image sensor may comprise a control interface arranged to provide the information about the position on the first image sensor, the size of a sensor area associated with the position on the first image sensor and the frame rate for image acquisition within said area, and an image data interface arranged to receive the image data.

At least one of the size of the sensor area associated with the position on the first image sensor and the frame rate for image acquisition within the area may depend on a number of periodically received positions being within a distance from each other below a first threshold.

The size of the sensor area associated with the position on the first image sensor may be arranged to increase with a number of periodically received positions being within a distance from each other above a first threshold and below a second threshold, wherein the increased sensor area grows in a direction of movement of positions of the periodically received positions.

The image acquisition controller may be arranged to recognise objects from the image data, wherein the information about the position on the first image sensor and the size of the sensor area associated with the position on the first image sensor provided over the interface towards the first image sensor is adapted based on a found object.

According to a second aspect, there is provided an image acquisition system comprising a first image sensor arranged to acquire an image, a gaze tracking unit comprising a second image sensor for registering a gaze position on a scene associated with the image acquired by the first image sensor, and an image acquisition controller according to the first aspect.

According to a third aspect, there is provided a communication device comprising a transceiver arranged to communicate with a communications network, and an image acquisition system according to the second aspect, wherein the communication device is capable of transmitting an adapted image based on the stored image data via the transceiver.

According to a fourth aspect, there is provided an image acquisition method comprising acquiring an image by a first image sensor, registering a series of gaze positions at a scene associated with the image acquired by the first image sensor, providing information to the first image sensor about a position on the first image sensor, a size of a sensor area associated with the position on the first image sensor and a frame rate for image acquisition within said area, receiving image data from the first image sensor wherein the image data at least comprises image data with the size, the position on the first image sensor, and the frame rate for image acquisition within said area, and storing an adapted image based on the received image data, where the scene represents a larger part of an image registered by the first image sensor than intended to be acquired as the adapted image.

The method may comprise monitoring timing of the gaze at the respective position on the scene, wherein the size of the sensor area associated with the position depends on a duration of the gaze at the position, respectively.

At least one of the size of the sensor area associated with the position on the first image sensor and the frame rate for image acquisition within the area may depend on a number of periodically received positions being within a distance from each other below a first threshold.

The size of the sensor area associated with the position on the first image sensor may be arranged to increase with a number of periodically received positions being within a distance from each other above a first threshold and below a second threshold, wherein the increased sensor area grows in a direction of movement of positions of the periodically received positions.

The method may comprise recognising objects from the image data, wherein the information about the position on the first image sensor and the size of the sensor area associated with the position on the first image sensor provided over the interface towards the first image sensor is adapted based on a found object.

According to a fourth aspect, there is provided a computer program comprising instructions which, when executed on a processor of an image acquisition device, causes the image acquisition device to perform the method according to the fourth aspect. A scene in this context is a part of reality that is enabled to be captured by one or more image sensors of one or more cameras of an available image acquisition system. The gaze tracking unit is thus enabled to register what piece or part of that scene that a user is looking at, which may be looked at directly, through a viewfinder, on a preview screen, etc.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Digital cameras, comprised in various devices, may be used for streaming content with object recognition, wherein full frames or lower resolution with full field of view of the camera may be used. This is done so that all objects that the camera can detect should be detected. For finding objects in an image, different algorithms can be used such as SURF, SIFT, ORB etc. These algorithms are specialized in finding edges, transitions etc. to point out where objects of interest might be. Once an object is detected the image can be cropped to a suitable size and processed in an image recognition algorithm. The herein suggested approach to tie up the Catch-22 case discussed above is to let the camera work more like the human eye. The field of view of the eye that produces a sharp image in colour is only a few degrees (Area of cones in the eye). The brain puts an image together based on the movement of the eye, which makes an image that is perceived larger than the narrow field of view of the cones. The eye will thus scan the parts of the scene comprising anything catching the interest of a person looking at the scene, e.g. on a preview screen or in a viewfinder, or in actual reality being imaged such as for augmented reality applications. For example, the preview image is captured at a lower resolution but over the whole image sensor area, which is enough for providing a preview on a screen for the user. The identified points of interest, made by tracking the eye of the user, may on the other hand be captured with higher resolution, i.e. an area around the identified points of interest, and the size of respective area may be determined from the tracking of the eye, e.g. from the time it is looked at, movements around the point of interest, etc.

Eye tracking, or gaze tracking, is known. A suitable approach is optical tracking which uses some non-contact, optical method for measuring eye motion. Light, typically infrared, may be reflected from the eye and sensed by a video camera or some other specially designed optical sensor. The information is then analysed to extract eye rotation from changes in reflections. Video-based eye trackers typically use the corneal reflection and the centre of the pupil as features to track over time. A more sensitive type of eye-tracker uses reflections from the front of the cornea and the back of the lens as features to track. A still more sensitive method of tracking is to image features from inside the eye, such as the retinal blood vessels, and follow these features as the eye rotates. Optical methods, particularly those based on video recording, are widely used for gaze tracking and are favoured for being non-invasive and inexpensive.

Figure 1:
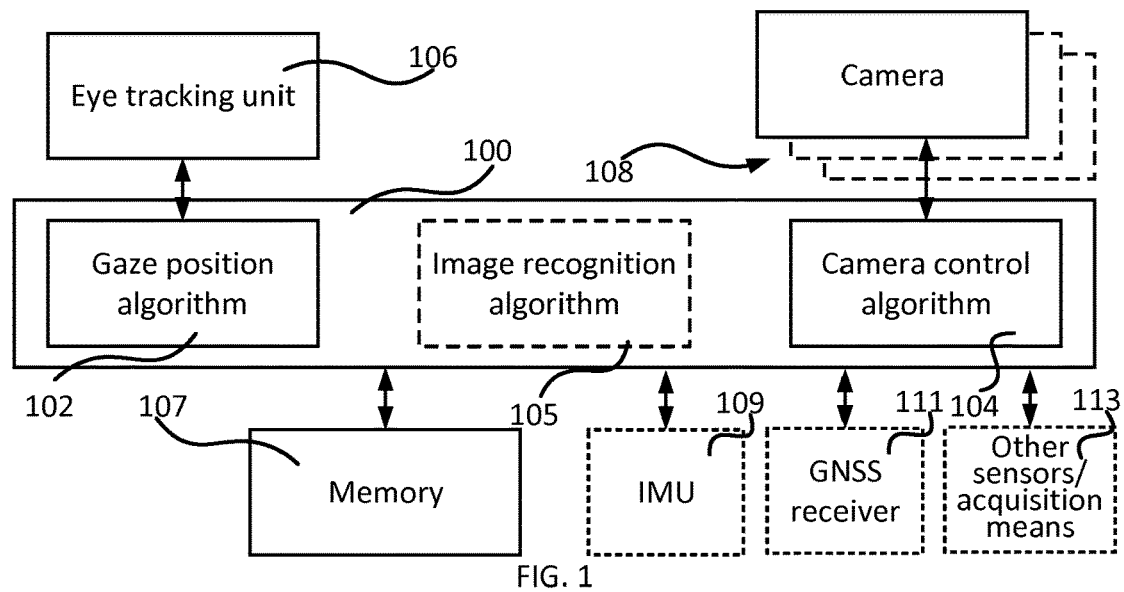
FIG. 1 schematically illustrates elements of an image acquisition device according to an embodiment.

FIG. 1 schematically illustrates elements involved in the suggested approach. An image acquisition controller 100 is arranged to host a gaze position algorithm 102, a camera control algorithm 104, and optionally an image recognition algorithm 105. The gaze position algorithm 102 interfaces with an eye tracking unit 106, which typically comprises an image sensor arranged to capture images of the user's eye. Other means for eye tracking is of course possible, but the approach to use an image sensor for tracking the eye have the benefit of not being intrusive on the user's body and provides a good accuracy. The camera control algorithm 104 interfaces with one or more cameras 108, i.e. image sensors which are controllable in sense of e.g. size, resolution, frame rate, etc. The image acquisition controller 100 may also interface with a memory 107 for storage of acquired images. The image acquisition controller 100 may also interface with an inertial measurement unit, IMU, 109, a global navigation satellite system, GNSS, receiver 111, or other sensors or information acquisition means 113 for further functionality of the image acquisition, e.g. for augmented reality, AR, applications.

The eye tracking unit 106 will output a signal holding information about the user's eye position and direction. The gaze position algorithm 102 will from this signal determine a corresponding position in relation to an image sensor of the one or more cameras 108, respectively.

The interface between the camera control algorithm 104 and the one or more image sensors of the camera(s) 108 typically comprises one control interface where the camera control algorithm provides control information about e.g. position, size, resolution, frame rate, etc. to make the sensor acquire the desired image data, which may be transmitted to the image acquisition controller 100 over a second interface, or over a common interface for the control information and image data. The control information provided to the image sensor is based on the output from the gaze position algorithm 102. For example, the gaze position algorithm determines that the user's eye is directed towards positions in vicinity of each other during some time, wherein the position provided to the image sensor is a mean position of those positions, and the size of a cropped part of the entire image sensor area to be acquired, and possibly the desired resolution thereof, provided to the image sensor depends e.g. on the time the user gazed at that area, and possibly on the spread of the determined positions, assuming that an object with a certain size was observed, may determine the size of the cropping, and possibly also the resolution. For example, a small spread of the determined positions may indicate a small object, and therefore maybe a high resolution is desired. A larger spread may indicate a larger object, and to keep amount of information within some bounds the resolution may be reduced while a larger size cropping is selected. For some applications, the resolution may be kept constant, and for some other applications, the size may be kept constant.

The acquired cropped image or images may be stored in the memory 107, from where it can be accessed and for example be further processed, e.g. for object recognition.

The image acquisition controller 100 periodically receives information over the interface towards the gaze tracking unit 106 about at least a position on the scene provided from the image sensor(s) 108 where the scene represents a larger part of an image registered by the first image sensor than intended cropped image to be acquired as the adapted image. The image acquisition controller 100 may thus monitor timing of the information over the interface towards the gaze tracking unit 106 about a gaze at the respective position on the scene, wherein the size of the sensor area associated with the position depends on a duration of the gaze at the position, respectively. The interface between the image acquisition controller 100 and the image sensor(s) may include a control interface arranged to provide the information about the position on the first image sensor, the size of a sensor area associated with the position on the first image sensor and the frame rate for image acquisition within said area, and an image data interface arranged to receive the image data. For example, at least one of the size of the sensor area associated with the position on the first image sensor and the frame rate for image acquisition within the area may depend on a number of periodically received positions being within a distance from each other below a first threshold, or the size of the sensor area associated with the position on the first image sensor may be arranged to increase with a number of periodically received positions being within a distance from each other above a first threshold and below a second threshold, where the size of the cropped sensor area grows in a direction of movement of positions of the periodically received positions.

The approach provides the advantage that objects of interest may be found easier with less consumption of computing effort and power consumption. However, the traditional object identification can still be applied but within the cropped images. The object identification data retrieved thereby can then be used in an iterative way to further refine cropping of images. The image acquisition controller can for example recognise objects from the adapted image data, wherein the information about the position on the first image sensor and the size of the sensor area associated with the position on the image sensor provided over the interface towards the first image sensor is adapted based on a found object to retrieve a further refined cropping, e.g. with a higher resolution and/or for extracting desired parts to be conveyed for further processing, locally or at a remote host. Here, the refined cropping can also comprise enlarging the cropped area.

The image acquisition controller 100 may be used in different kind of devices, such as digital cameras, gaming devices, etc. Any such device can be considered as an image acquisition system comprising at least a first image sensor 108 arranged to acquire an image, a gaze tracking unit 106 comprising a second image sensor for registering a gaze position on a scene associated with an image acquired by the first image sensor, and an image acquisition controller 100 as demonstrated above. The image acquisition system can also be part of a general-purpose communication device such as a smartphone. The communication device can thus comprise a transceiver arranged to communicate with a communications network, and the image acquisition system. The communication device can for example transmit an adapted image based on one or more stored images, i.e. cropped identified parts from the image sensor, via the transceiver. One application for the image acquisition controller 100 is for controlling augmented reality, AR, applications, where the image acquisition system includes, in addition to the image acquisition controller 100, a processing device for providing an enhanced image and a display, preferably adapted for the AR application, to provide the image enhancements. This would provide for an AR device. Other applications, such as virtual reality, VR, applications, enhanced user interfaces, UIs, including for example AR features, tactile enhancements, etc., gaming applications, etc., and corresponding devices would be readily derivable from this disclosure.

Figure 2:
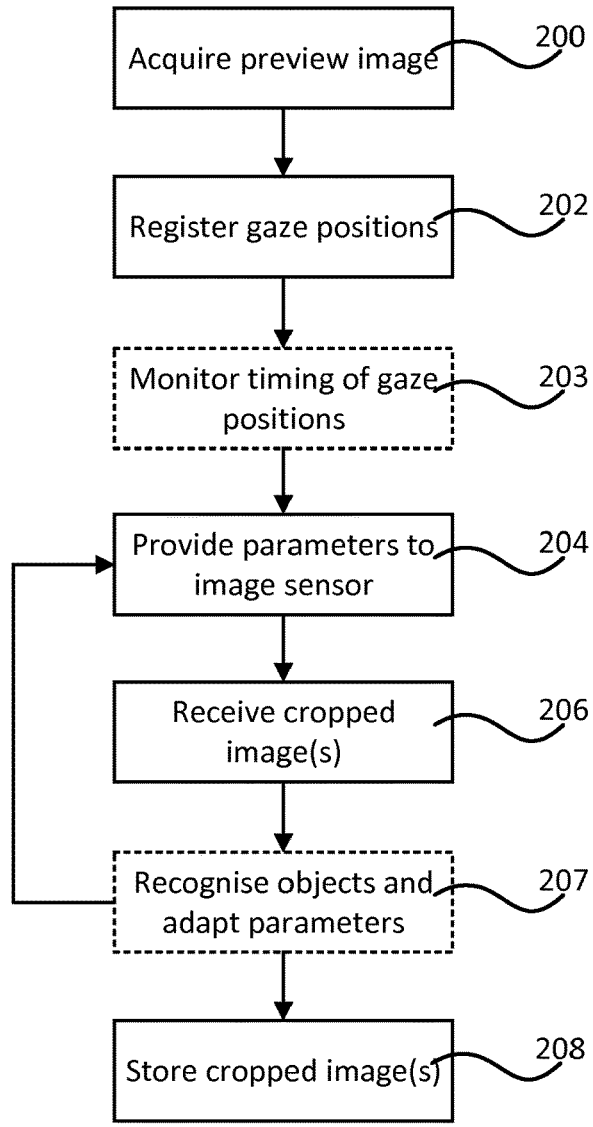
FIG. 2 is a flow chart illustrating a method according to an embodiment.

FIG. 2 is a flow chart illustrating an image acquisition method according to embodiments. The method comprises acquiring 200 an image by a first image sensor, i.e. the one of the actual camera, and registering 202 a series of gaze positions at a scene associated with the image acquired by the first image sensor, providing 204 information to the first image sensor about a position, corresponding to the registered position, on the first image sensor, a size of a sensor area associated with the position on the first image sensor and a frame rate for image acquisition within said area, receiving 206 image data from the first image sensor wherein the image data at least comprises image data with the size of activated part of the first image sensor, the position on the first image sensor, and the frame rate for image acquisition within said area, and storing 208 an adapted image based on the received image data. The scene represents a larger part of an image registered by the first image sensor than intended to be acquired as the adapted image.

The size of the sensor area associated with the respective position can for example depend on a duration of the gaze at the position. This can be achieved by monitoring 203 timing of the gaze at the respective position on the image.

The providing 204 of the information about the position on the first image sensor, the size of a sensor area associated with the position on the first image sensor and the frame rate for image acquisition within said area to the first image sensor causes the image sensor to provide image data accordingly such that the image data related to the provided information can be received 206 from the first image sensor. The selection of parameters such as size, frame rate, etc. for respective identified position may be determined from the gaze information based on some assumptions. For example, at least one of the size of the sensor area associated with the position on the first image sensor and the frame rate for image acquisition within the area may depend on several periodically received positions being within a distance from each other below a first threshold. Here, the assumption may be made that the user looks at an object for a while wherein the parameters are selected such that image(s) is(are) retrieved with desired quality and covering the object. Another example may be that the size of the sensor area associated with the position on the first image sensor is arranged to increase with several periodically received positions being within a distance from each other above a first threshold and below a second threshold, wherein the increased sensor area grows in a direction of movement of positions of the periodically received positions. Here, the assumption may be that an observed object has a certain size on the image sensor and that the gaze sweeps over the size of the object.

As discussed above, object recognition may be iterative in sense that a first iteration comprises the gaze-controlled cropping and a second iteration comprises object recognition by signal processing based on the first cropping. The method may thus comprise recognising 207 objects from the image data, wherein the information about the position on the first image sensor and the size of the sensor area associated with the position on the first image sensor provided over the interface towards the first image sensor is adapted based on a found object, and another retrieval of image data is performed to get to the adapted image to be stored 208. One example is that the image recognition in this iteration is a crude image processing made locally to get a fair enough identification to improve the cropping, while the stored image then may be more seriously processed, e.g. at a remote unit having better processing capabilities in sense of processing power and/or available energy, to make a final object recognition.

Figure 3:
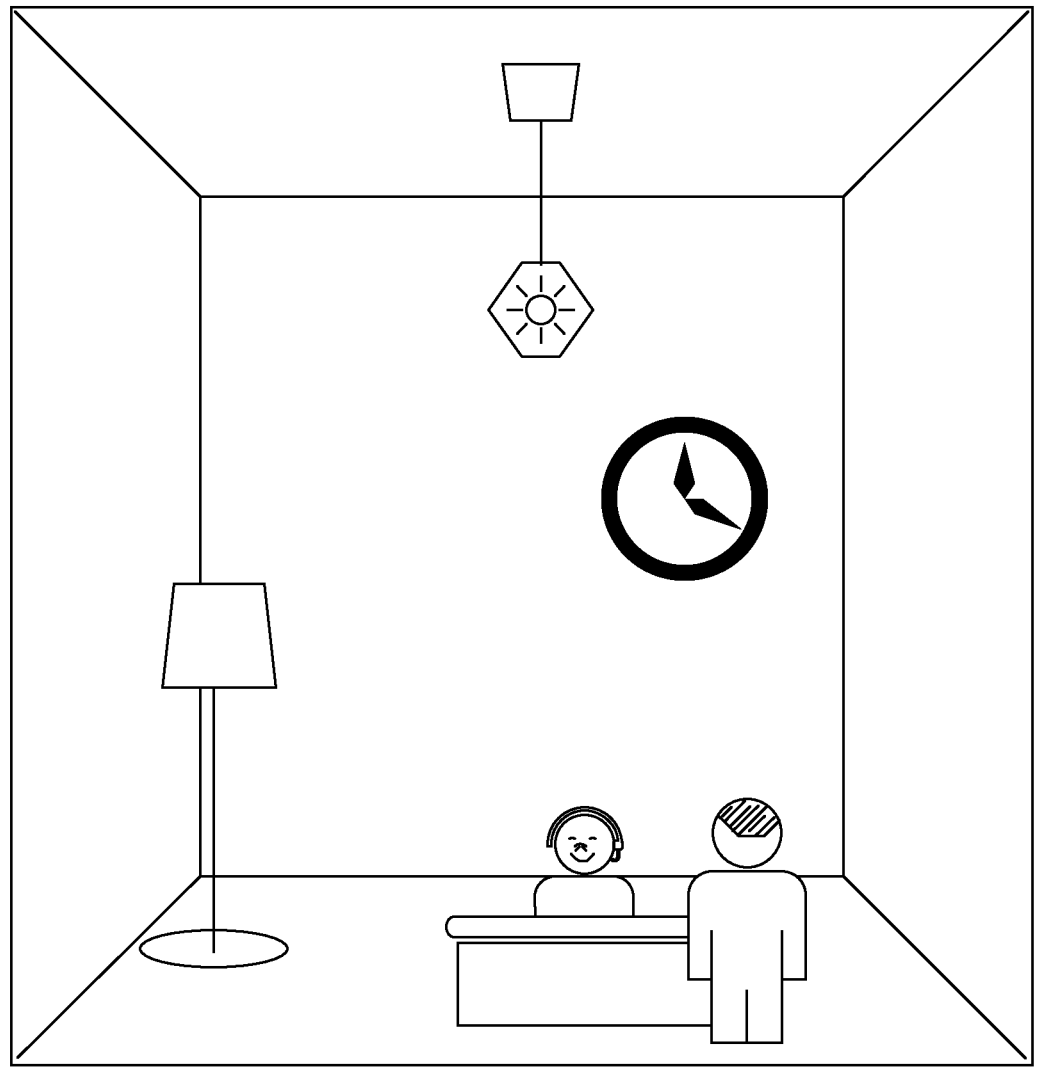
FIG. 3 illustrates a scene used for explaining principles of some embodiments.
Figure 4:
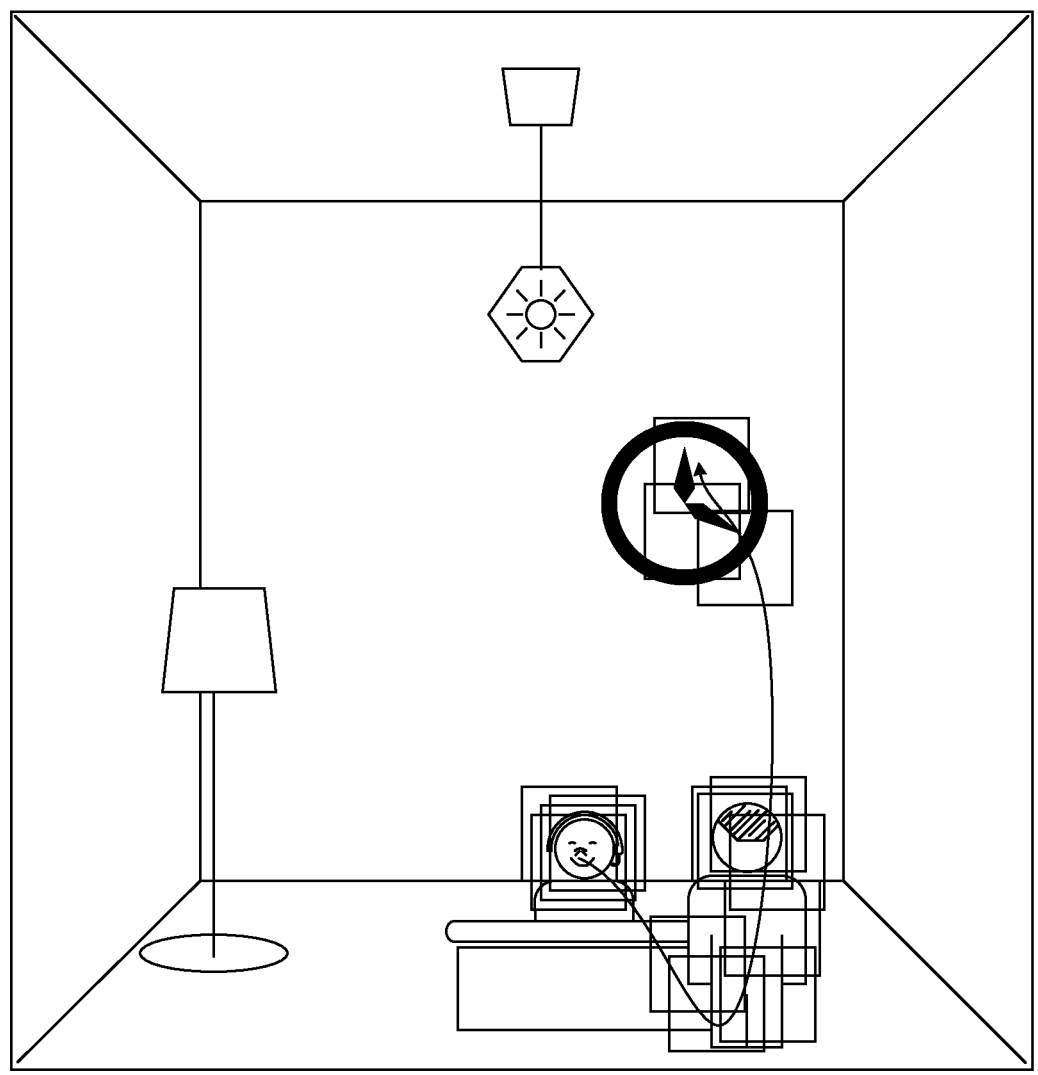
FIG. 4 illustrates the scene of FIG. 3 where gaze tracking has picked areas to analyse.
Figure 5:
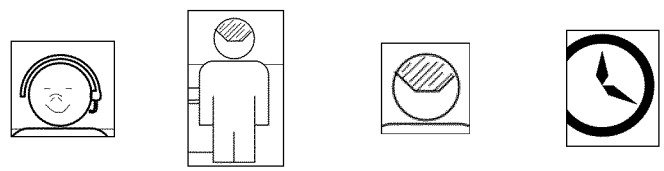
FIG. 5 illustrates cropped images from the scene of FIG. 3 using the gaze tracking information indicated in FIG. 4.

FIG. 3 represents a scene enabled to be captured as an image, as discussed above. FIG. 4 represents the same scene where results of gaze tracking is indicated. The curved arrow here represents the general eye movement and the squares indicate periodically determined positions. Thus, along some parts of the curved arrow, the eye movement has been too quick to set off a square, which is assumed to mean that the user did not find anything interesting there. At some parts, multiple overlapping squares have been set off, assumed to indicate points of interest. Based on the tracked gaze, parameters are assumed to be formed and provided to the image sensor which then has provided cropped sub-images, as indicated in FIG. 5, to be stored.

Figure 6:
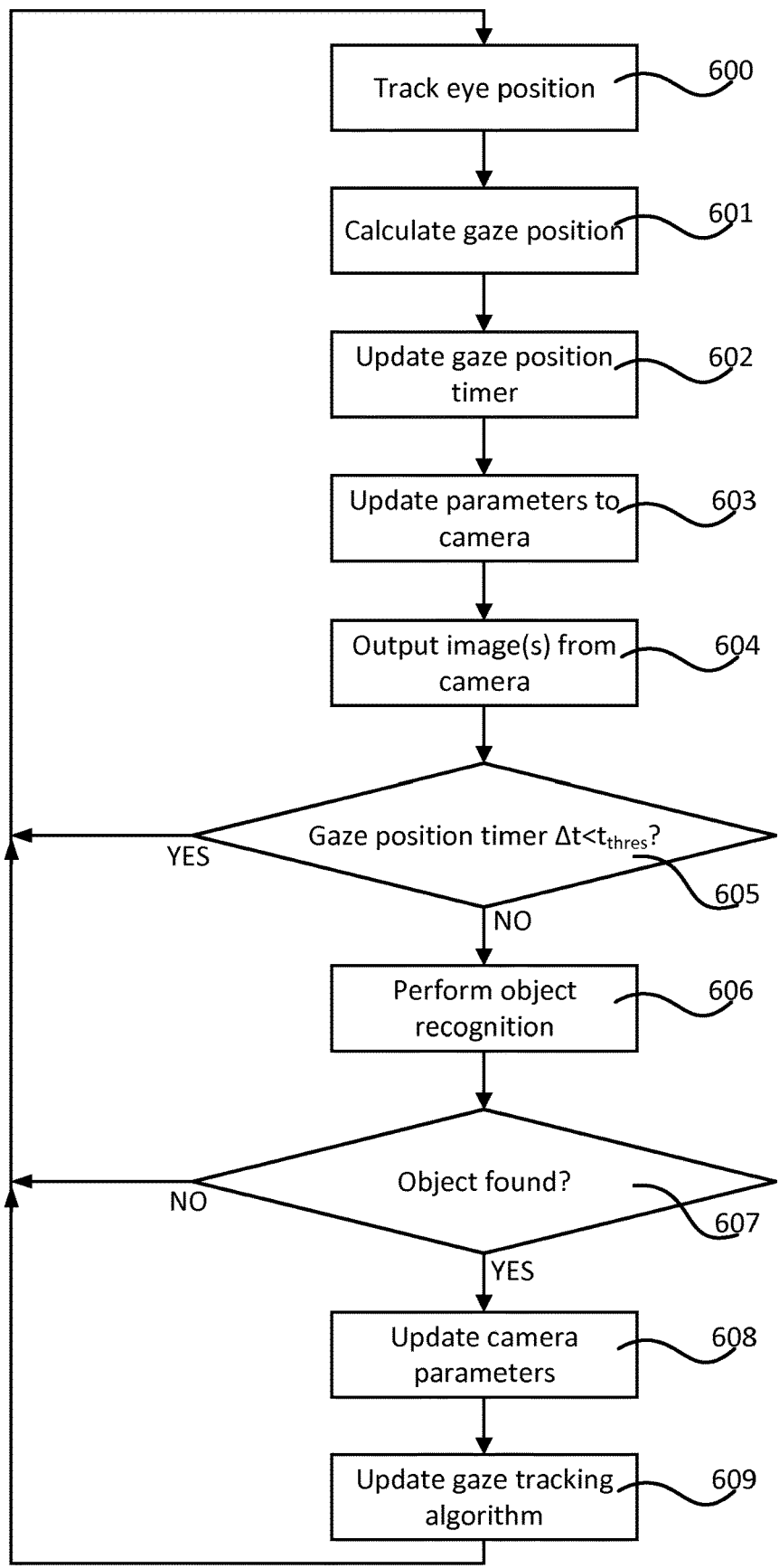
FIG. 6 is a flow chart illustrating a method according to an embodiment.

FIG. 6 is a flow chart illustrating a method according to an embodiment. Eye position is tracked 600. From the eye tracking information, a gaze position is calculated 601 which corresponds to a position on an image sensor arranged to capture the desired image. Timing of gazing is monitored by updating 602 a gaze position timer. Thereby, it can be monitored whether the user gazes at a certain part corresponding to a part of the scene which may be assumed to hold an object of interest. An object is here something which will be imaged by the image sensor. Based on the calculated position(s) and the timing thereof, parameters for the camera with its image sensor are updated 603, and the camera outputs 604 image(s) based on the parameters. It is determined 605 whether the gaze position timer for a gaze position, where positions in close vicinity, e.g. having a mutual distance below a threshold, are counted as one position for the determination, is below a time threshold. If the timer is below the time threshold, the procedure 600-604 is repeated. If the timer has reached the time threshold, object recognition for the position is performed 606. That is, image data in an area around the position is processed to recognize an object, e.g. using any of the image recognition algorithms discussed above. It is determined 607 whether an object was found. If no object was found, the procedure returns to tracking 600 the eye position. If an object was found, camera parameters are updated 608 accordingly. That is, the camera is instructed to capture an image corresponding to the found object. The gaze tracking algorithm may also be updated 609 based on the successful capturing of the object. The procedure then continues with the eye tracking 600.

Figure 7:
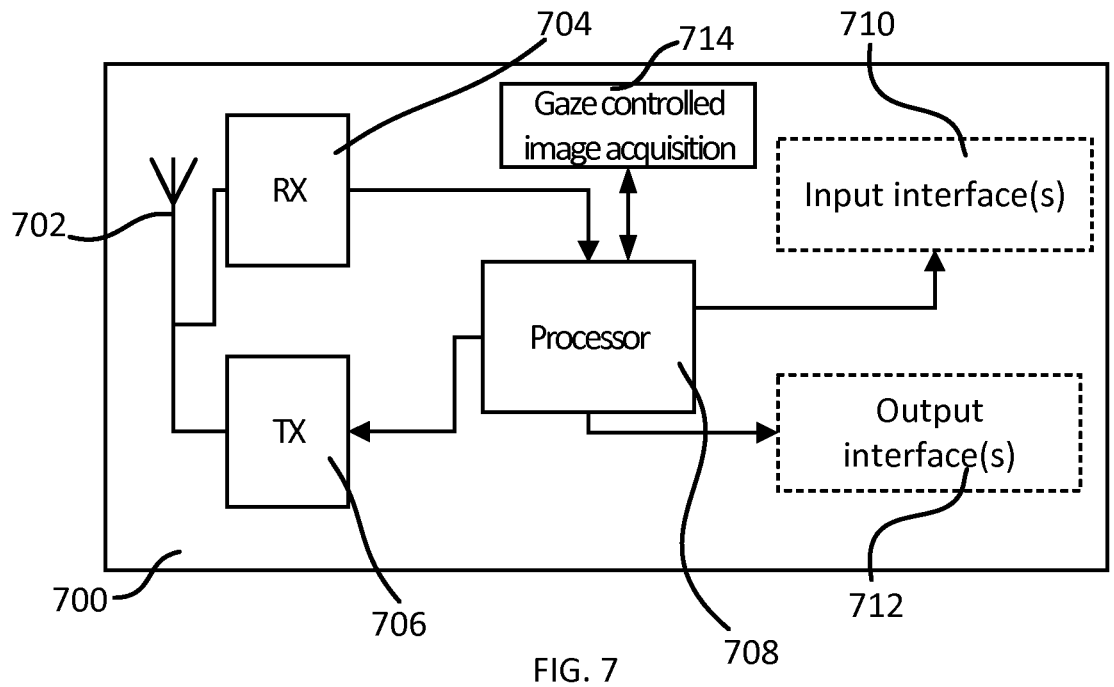
FIG. 7 is a block diagram schematically illustrating a communication device comprising an image acquisition device according to an embodiment.

FIG. 7 is a block diagram schematically illustrating an image acquisition device 700 according to an embodiment. The image acquisition device may be capable of wireless communication and then comprises an antenna arrangement 702, a receiver 704 connected to the antenna arrangement 702, and a transmitter 706 connected to the antenna arrangement 702. The image acquisition device comprises a processing element 708 which may comprise one or more circuits, one or more input interfaces 710 and one or more output interfaces 712. The interfaces 710, 712 can be user interfaces and/or signal interfaces, e.g. electrical or optical. The image acquisition device 700 may be arranged to operate in a cellular communication network.

The image acquisition device 700 comprises circuitry 714 for gaze controlled image acquisition, i.e. elements as demonstrated with reference to FIG. 1. The circuitry 714 for gaze controlled image acquisition is connected to the processing element 708, which may contribute with some or all of the control and/or processing demonstrated above. In particular, by the processing element 708 being arranged to support the performing of the embodiments demonstrated with reference to FIGS. 2 to 6, the image acquisition device 700 is capable of the power lean image acquisition as discussed above. The processing element 708 can also fulfil a multitude of tasks, ranging from signal processing to enable reception and transmission since it is connected to the receiver 704 and transmitter 706, executing applications, controlling the interfaces 710, 712, etc.

One advantage according to some embodiments is that only selected parts of the image sensor(s) which are of interest are activated, e.g. for high-resolution image registration, which is inherently power saving.

One advantage according to some embodiments is that only selected parts of the scene is subject for image capturing and saving, and possibly processing, which is inherently power saving.

Further advantages, such as limitation of heat generation in image sensor(s), limitation of use of bandwidth of busses and/or external interfaces, increased speed of processing for given hardware resources, etc. may also be provided.

Figure 8:
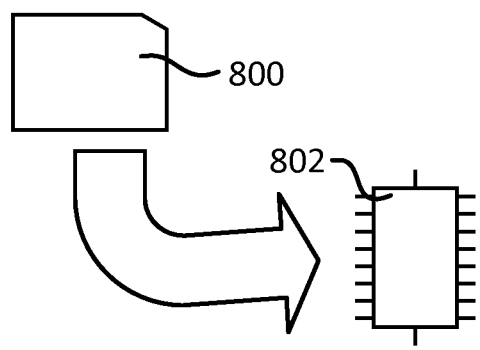
FIG. 8 schematically illustrates a computer-readable medium and a processing device.

The methods according to the present invention is suitable for implementation with aid of processing means, such as computers and/or processors, especially for the case where the processing element 708 demonstrated above comprises a processor controlling the power lean image acquisition. Therefore, there is provided computer programs, comprising instructions arranged to cause the processing means, processor, or computer to perform the steps of any of the methods according to any of the embodiments described with reference to FIG. 2 to 6. The computer programs preferably comprise program code which is stored on a computer readable medium 800, as illustrated in FIG. 8, which can be loaded and executed by a processing means, processor, or computer 802 to cause it to perform the methods, respectively, according to embodiments of the present invention, preferably as any of the embodiments described with reference to FIGS. 2 to 6. The computer 802 and computer program product 800 can be arranged to execute the program code sequentially where actions of the any of the methods are performed stepwise, or perform actions on a real-time basis. The processing means, processor, or computer 802 is preferably what normally is referred to as an embedded system. Thus, the depicted computer readable medium 800 and computer 802 in FIG. 8 should be construed to be for illustrative purposes only to provide understanding of the principle, and not to be construed as any direct illustration of the elements.

The invention claimed is:

1. An image acquisition controller for acquiring an adapted image, the image acquisition controller comprising:
   an interface towards a first image sensor, the first image sensor being arranged to acquire an image; and
   an interface towards a gaze tracking unit, the gaze tracking unit comprising a second image sensor for registering a gaze position on a scene associated with an image acquired by the first image sensor, wherein:
   the image acquisition controller is arranged to periodically receive information over the interface towards the gaze tracking unit about at least a position on the scene associated with the image provided from the first image sensor where the scene represents a larger part of an image registered by the first image sensor than intended to be acquired as the adapted image;
   the image acquisition controller is arranged to provide information over the interface towards the first image sensor about a position on the first image sensor, a size of a sensor area associated with the position on the first image sensor and a frame rate for image acquisition within said area; and
   the image acquisition controller is arranged to receive image data over the interface towards the first image sensor wherein the image data at least comprises image data with the size, the position on the first image sensor, and the frame rate for image acquisition within said area such that the received image data is stored,
   wherein the size of the sensor area associated with the position on the first image sensor is arranged to increase with a number of periodically received positions being within a distance from each other above a first threshold and below a second threshold, wherein the increased sensor area grows in a direction of movement of positions of the periodically received positions.

2. The image acquisition controller of claim 1, wherein the image acquisition controller is arranged to monitor timing of the information over the interface towards the gaze tracking unit about a gaze at the respective position on the scene, wherein the size of the sensor area associated with the position depends on a duration of the gaze at the position, respectively.

3. The image acquisition controller of claim 1, wherein the interface towards the first image sensor comprises:
   a control interface arranged to provide the information about the position on the first image sensor, the size of a sensor area associated with the position on the first image sensor and the frame rate for image acquisition within said area; and
   an image data interface arranged to receive the image data.

4. The image acquisition controller of claim 1, wherein at least one of the size of the sensor area associated with the position on the first image sensor and the frame rate for image acquisition within the area depends on a number of periodically received positions being within a distance from each other below a first threshold.

5. The image acquisition controller of claim 1, arranged to recognise objects from the image data, wherein the information about the position on the first image sensor and the size of the sensor area associated with the position on the first image sensor provided over the interface towards the first image sensor is adapted based on a found object.

6. An image acquisition system comprising:
   a first image sensor arranged to acquire an image;
   a gaze tracking unit comprising a second image sensor for registering a gaze position on a scene associated with an image acquired by the first image sensor; and
   an image acquisition controller according to claim 1.

7. A communication device comprising:
   a transceiver arranged to communicate with a communications network; and
   an image acquisition system according to claim 6,
   wherein the communication device is capable of transmitting an adapted image based on the stored image data via the transceiver.

8. An image acquisition method comprising:
   acquiring an image by a first image sensor;
   registering a series of gaze positions at a scene associated with the image acquired by the first image sensor;
   providing information to the first image sensor about a position on the first image sensor, a size of a sensor area associated with the position on the first image sensor and a frame rate for image acquisition within said area;
   receiving image data from the first image sensor wherein the image data at least comprises image data with the size, the position on the first image sensor, and the frame rate for image acquisition within said area; and
   storing an adapted image based on the received image data, where the scene represents a larger part of an image registered by the first image sensor than intended to be acquired as the adapted image,
   wherein the size of the sensor area associated with the position on the first image sensor is arranged to increase with a number of periodically received positions being within a distance from each other above a first threshold and below a second threshold, wherein the increased sensor area grows in a direction of movement of positions of the periodically received positions.

9. The method of claim 8, comprising monitoring timing of the gaze at the respective position on the scene, wherein the size of the sensor area associated with the position depends on a duration of the gaze at the position, respectively.

10. The method of claim 8, wherein at least one of the size of the sensor area associated with the position on the first image sensor and the frame rate for image acquisition within the area depends on a number of periodically received positions being within a distance from each other below a first threshold.

11. The method of claim 8, comprising recognising objects from the image data, wherein the information about the position on the first image sensor and the size of the sensor area associated with the position on the first image sensor provided over the interface towards the first image sensor is adapted based on a found object.

12. A non-transitory computer readable storage medium comprising a computer program comprising instructions which, when executed on a processor of an image acquisition device, causes the image acquisition device to perform an image acquisition method comprising:

acquiring an image by a first image sensor;
 registering a series of gaze positions at a scene associated with the image acquired by the first image sensor;
 providing information to the first image sensor about a position on the first image sensor, a size of a sensor area associated with the position on the first image sensor and a frame rate for image acquisition within said area;
 receiving image data from the first image sensor wherein the image data at least comprises image data with the size, the position on the first image sensor, and the frame rate for image acquisition within said area; and
 storing an adapted image based on the received image data, where the scene represents a larger part of an image registered by the first image sensor than intended to be acquired as the adapted image,
 wherein the size of the sensor area associated with the position on the first image sensor is arranged to increase with a number of periodically received positions being within a distance from each other above a first threshold and below a second threshold, wherein the increased sensor area grows in a direction of movement of positions of the periodically received positions.

* * * * *

UNITED STATES PATENT AND TRADEMARK OFFICE
CERTIFICATE OF CORRECTION

| | |
|---|---|
| PATENT NO. | : 12,003,846 B2 |
| APPLICATION NO. | : 17/425936 |
| DATED | : June 4, 2024 |
| INVENTOR(S) | : Hunt et al. |

It is certified that error appears in the above-identified patent and that said Letters Patent is hereby corrected as shown below:

On the Title Page

In Item (72), under "Inventors", in Column 1, Line 1, delete "Tygelsö (SE);" and insert -- Tygelsjö (SE); --, therefor.

In the Specification

In Column 3, Lines 38-44, delete "A scene……………..screen, etc." and insert the same in Line 39, as a new paragraph.

In Column 4, Line 6, delete "in" and insert -- of --, therefor.

In Column 7, Line 26, delete "covering" and insert -- cover --, therefor.

In Column 9, Line 14, delete "FIG. 2 to 6." and insert -- FIGS. 2 to 6. --, therefor.

In Column 9, Line 23, delete "of the" and insert -- of --, therefor.

Signed and Sealed this
Fifth Day of November, 2024

*Katherine Kelly Vidal*
Katherine Kelly Vidal
*Director of the United States Patent and Trademark Office*